(12) United States Patent
Sasaki

(10) Patent No.: US 9,563,189 B2
(45) Date of Patent: Feb. 7, 2017

(54) CARD ISSUING APPARATUS

(75) Inventor: Hideyoshi Sasaki, Tokyo (JP)

(73) Assignee: DODWELL B • M • S LTD., Tokyo (JP)

( * ) Notice: Subject to any disclaimer, the term of this patent is extended or adjusted under 35 U.S.C. 154(b) by 557 days.

(21) Appl. No.: 14/001,582

(22) PCT Filed: Feb. 20, 2012

(86) PCT No.: PCT/JP2012/054681
§ 371 (c)(1),
(2), (4) Date: Aug. 26, 2013

(87) PCT Pub. No.: WO2012/160849
PCT Pub. Date: Nov. 29, 2012

(65) Prior Publication Data
US 2013/0331974 A1   Dec. 12, 2013

(30) Foreign Application Priority Data

May 20, 2011   (JP) ................. 2011-113939

(51) Int. Cl.
*G05B 15/02*   (2006.01)
*G06K 19/077*   (2006.01)
*G06K 17/00*   (2006.01)

(52) U.S. Cl.
CPC ......... *G05B 15/02* (2013.01); *G06K 19/07716* (2013.01); *G06K 2017/0041* (2013.01)

(58) Field of Classification Search
None
See application file for complete search history.

(56) References Cited

U.S. PATENT DOCUMENTS 5,036,461 A  *  7/1991  Elliott ................. G06Q 20/105
                                                       235/380
2007/0080208 A1     4/2007  Gampe et al.
(Continued)

FOREIGN PATENT DOCUMENTS

JP         H06509895 A       11/1994
JP         2000-259370 A      9/2000
(Continued)

OTHER PUBLICATIONS

Decision to Grant a Patent drafted on Jun. 25, 2013 in corresponding Japanese Patent Application No. 2011-113939.
(Continued)

*Primary Examiner* — Mohammad Ali
*Assistant Examiner* — Saad M Kabir
(74) *Attorney, Agent, or Firm* — Typha IP LLC

(57) ABSTRACT

A card issuing apparatus that includes a plurality of processing units that perform predetermined processing on a card, which enables reduction of the installation space thereof, is described. A card issuing apparatus that performs processing on a card to be processed and issues the processed card includes: a plurality of processing units including at least a first processing unit that executes a process of forming at least one of a character string and a symbol on a surface of the card to be processed, and a second processing unit that executes a process of recording information on a recording medium included in the card to be processed. The plurality of processing units are installed in the card issuing apparatus body to be arranged in the up-down direction.

6 Claims, 10 Drawing Sheets

(56) References Cited

U.S. PATENT DOCUMENTS

| | | | |
|---|---|---|---|
| 2009/0111562 A1* | 4/2009 | Chudd | G07D 7/0006 463/20 |
| 2009/0152790 A1 | 6/2009 | Kirschbauer et al. | |
| 2010/0071831 A1 | 3/2010 | Peters et al. | |

FOREIGN PATENT DOCUMENTS

| | | | |
|---|---|---|---|
| JP | 2005516312 A | 6/2005 |
| JP | 2005-262722 A | 9/2005 |
| JP | 2006520041 A | 8/2006 |
| JP | 2007-265136 A | 10/2007 |
| JP | 2007-280156 A | 10/2007 |
| JP | 2009-048630 A | 3/2009 |
| JP | 2009537882 A | 10/2009 |
| JP | 2010-506750 A | 3/2010 |
| WO | 9304433 A1 | 3/1993 |
| WO | 03065299 A2 | 8/2003 |

OTHER PUBLICATIONS

International Search Report of PCT/JP2012/054681 mailed on Apr. 17, 2012.

* cited by examiner

CARD ISSUING APPARATUS

CROSS REFERENCE TO RELATED APPLICATIONS

This application is National Phase filing under 35 U.S.C. §371 of PCT/JP2012/054681 filed on Feb. 20, 2012, which claims priority to Japanese Patent Application No. 2011-113939 filed on May 20, 2011, under U.S.C. §119, the entire contents of which are incorporated hereby reference.

TECHNICAL FIELD

The present invention relates to a card issuing apparatus, and more specifically, to a card issuing apparatus that processes a card to be processed to create a processed card and issues the processed card to a card user.

BACKGROUND ART

Cards such as credit cards or cash cards are issued when a user applies for cards, and conventionally, are delivered to the user after several days from the application. Meanwhile, in recent years, there are increasing needs for cards to be issued instantly. Thus, establishment of a system capable of delivering a card to a user over the counter when the user applies for the card over the counter is required. A card issuing system capable of dealing with the needs is already proposed (for example, see Patent Document 1).

An instant IC card issuing system disclosed in Patent Document 1 is constructed by a card issuing machine installed in a store that a user visits and a center server installed in a center different from the store. When a user performs application (specifically, an operation of inputting customer data) for issuance of cards at a booth in a store, the customer data is sent to a center server. Then, the center server performs processing for examining the allowability of card issuance based on the customer data. When card issuance is allowed, data necessary for issuing the card is generated in the center server and is sent to the store. Upon receiving the data, the card issuing machine operates to execute predetermined processing based on the data. Finally, the card is issued according to the content of the user's application.

CITATION LIST

Patent Document

Patent Document 1: JP 2009-048630 A

DISCLOSURE OF THE INVENTION

Problem to be Solved by the Invention

For instant card issuance to be realized, devices such as a printer and an embosser for performing printing and embossing on the card surface, a device for attaching labels to cover a character string or a symbol printed on the card, devices such as an IC writer and an encoder for writing information to an IC chip or a magnetic stripe, and other devices are mounted in the card issuing machine. That is, the card issuing machine capable of instantly issuing cards is configured to mount a plurality of devices that perform predetermined processing on the card to have a plurality of functions.

Meanwhile, in the store where the card issuing machine is installed, it is necessary to reduce the installation space of the card issuing machine as much as possible in order effectively utilize the space in the store. Specifically, as described above, since a plurality of devices that perform predetermined processing on a card are mounted in the card issuing machine capable of instantly issuing cards, the installation space becomes a problem.

Further, a combination of devices (devices that perform processing on cards) mounted in the card issuing machine and an arrangement of the devices have many variations and are determined according to the type of an issued card, for example. That is, as specifications of the card issuing machine, it is preferable that the users of the card issuing machine can freely design the combination of devices mounted in the card issuing machine and the arrangement of the devices. In addition, there is a need to allow a card conveyance path in the card issuing machine to flexibly adapt to any combination of the devices.

Therefore, the present invention has been made in view of the above problems, and an object of the present invention is to reduce the installation space of a card issuing apparatus which includes a plurality of processing units that perform a predetermined processing on a card. Another object of the present invention is to provide a card issuing apparatus which includes a plurality of processing units that perform predetermined processing on a card; in which the degree of freedom in a combination of the processing units is improved according to needs of a user of the card issuing machine, and a card conveyance path configured to flexibly adapt to a variation in the combination is included in the apparatus.

Means for Solving Problem

According to the present invention, the problems are solved by a card issuing apparatus that performs processing on a card to be processed to create a processed card and issues the processed card to a card user, including: a plurality of processing units including at least a first processing unit that executes a process of forming at least one of a character string and a symbol on a surface of the card to be processed, and a second processing unit that executes a process of recording information on a recording medium included in the card to be processed, in which the plurality of processing units are installed in the card issuing apparatus body to be arranged in the up-down direction. According to the card issuing apparatus, since the plurality of processing units are fixed to the card issuing apparatus body in a state of being arranged vertically, it is possible to reduce the installation area as compared to a configuration in which the plurality of processing units are arranged horizontally. That is, the installation space of the card issuing apparatus is reduced, and the inner space of the store or the like in which the card issuing apparatus is installed can be effectively utilized.

In the card issuing apparatus, each of the plurality of processing units has constituent components that are integrated into a unit and is detachably attached to the card issuing apparatus body, the card issuing apparatus includes: an accommodation unit that accommodates the card to be processed; and a lifting unit that receives the card to be processed from the accommodation unit and conveys the received card to be processed in the up-down direction to deliver the card to be processed to each of the processing units, and the lifting unit delivers the card to be processed to one of the plurality of processing units, receives the card to be processed again from the processing unit after the one of the plurality of processing units executes processing, and conveys the card to be processed in the up-down direction in order to deliver the card to be processed which has been received from the one of the plurality of processing units to another processing unit. Due to this configuration, the degree of freedom of the combination of the processing units is improved, and a card conveyance path that is flexible to the variation of the combination is included in the apparatus.

Specifically, since constituent components of each of the plurality of processing units are integrated into a unit, the processing unit can be easily fixed to the card issuing apparatus body. Moreover, since the processing units can be detachably attached to the card issuing apparatus body, it is possible to freely set the combination of the processing units. Further, the lifting unit is provided as a card conveying mechanism, and the lifting unit conveys a card (card to be processed) in the up-down direction in order to deliver the card to the respective processing units and receives the card again from the processing unit after the processing of the respective processing units ends. In this manner, in the card issuing apparatus, the card is conveyed by the lifting unit so that the card is returned to the lifting unit to be subjected to the next processing step after the card is processed by the processing unit. In this manner, even when the combination of the processing units is changed, it is not necessary to change the card conveyance path; the card conveyance path that is flexible to the variation in the combination is included in the apparatus.

In addition to the above configuration, it is preferable that the plurality of processing units include a third processing unit that executes a process of attaching a cover that covers at least one of the character string and the symbol, which is formed on the surface of the card to be processed by the first processing unit, to the surface of the card to be processed, and that the lifting unit delivers the card to be processed to the first processing unit, receives the card to be processed again from the first processing unit after the first processing unit executes the processing, and conveys the card to be processed in the up-down direction in order to deliver the card to be processed which has been received from the first processing unit to the third processing unit. According to this configuration, in a card issuing apparatus that issues a card on which a label or a seal is attached to conceal printed characters, for example, it is possible to reduce the installation space, improve the degree of freedom in the combination of the processing units according to the user's needs, and to allow a card conveyance path capable of flexibly adapting to a variation in the combination to be included in the apparatus.

In addition to the above configuration, it is preferable that the card issuing apparatus be configured to create plural types of the processed cards by processing the plural types of the cards to be processed, and that the accommodation unit is provided for each type of the cards to be processed. According to this configuration, in a card issuing apparatus capable of issuing plural types of cards, it is possible to reduce the installation space, improve the degree of freedom in the combination of the processing units according to the user's needs, and to allow a card conveyance path capable of flexibly adapting to a variation in the combination to be included in the apparatus.

In addition to the above configuration, it is further preferable that the card issuing apparatus body includes an equal number of storage units to the number of processing units or more, which are arranged in the up-down direction, each storage unit storing only one processing unit inside thereof, the card issuing apparatus body includes: a connection terminal provided for each of the storage units to be connected to the processing unit stored in the storage unit, a signal output unit that is provided in the processing unit to output a signal for specifying the processing unit when the processing unit is connected to the connection terminal in the storage unit, and a control unit that recognizes which processing unit of the plurality of processing units is stored in each of the storage units based on the signal that has been received from the signal output unit and that controls the lifting unit based on correspondence between the storage unit and the processing unit so that the card to be processed is conveyed to a position in the up-down direction, of the storage unit in which the processing unit that receives the card to be processed is stored. According to this configuration, the correspondence between the storage unit and the processing unit is acknowledged by the card issuing apparatus, and the card (card to be processed) can be appropriately conveyed based on the correspondence. As a result, the processing of the processing units is performed on the card in a well-ordered manner, and the card can be appropriately conveyed.

Effect of the Invention

According to the card issuing apparatus of the present invention, it is possible to reduce the installation space and to effectively utilize the inner space of a store or the like in which the card issuing apparatus is installed. Moreover, the degree of freedom in the combination of the processing units mounted in the card issuing apparatus is improved. Further, the card conveyance path that can flexibly adapt to a variation in the combination of the processing units is provided in the card issuing apparatus.

DETAILED DESCRIPTION OF THE INVENTION

Figure 1:
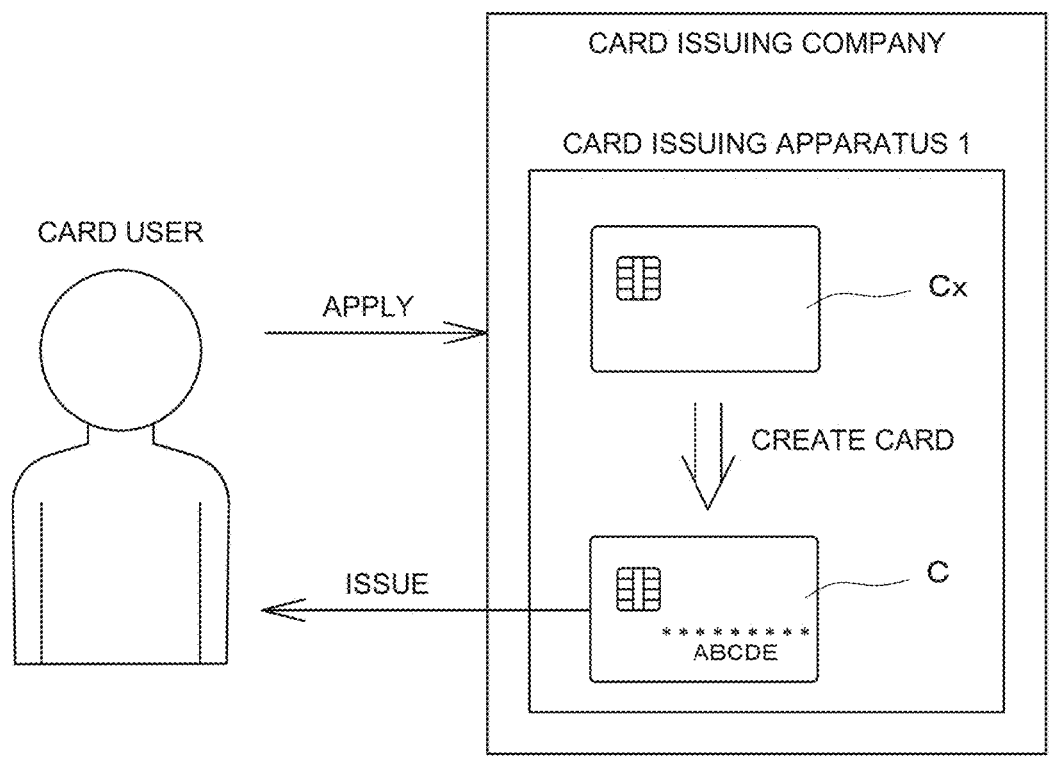
FIG. 1 is a diagram illustrating a card issuing procedure.
Figure 2:
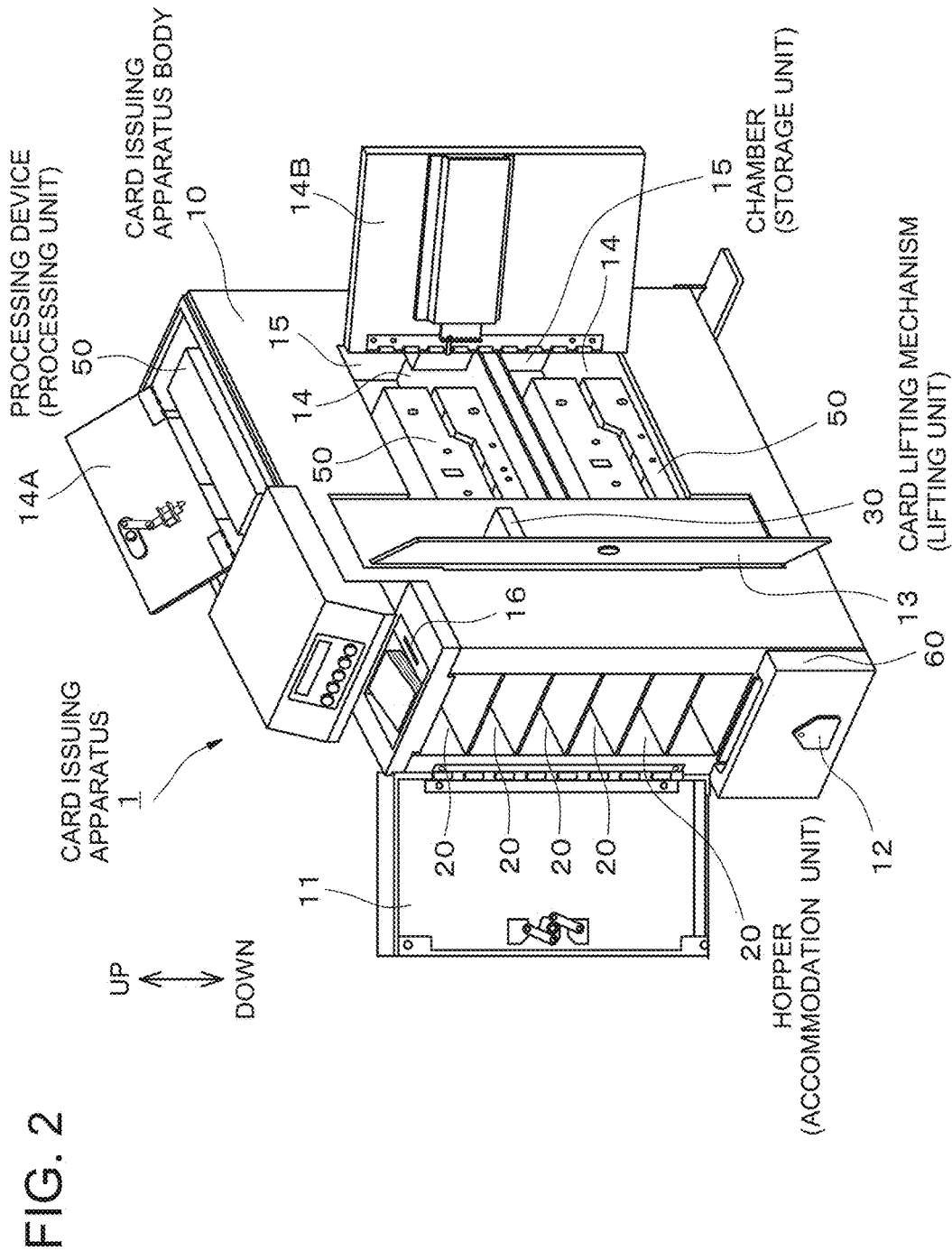
FIG. 2 is a schematic perspective view of a card issuing apparatus 1 according to an embodiment of the present invention.
Figure 3:
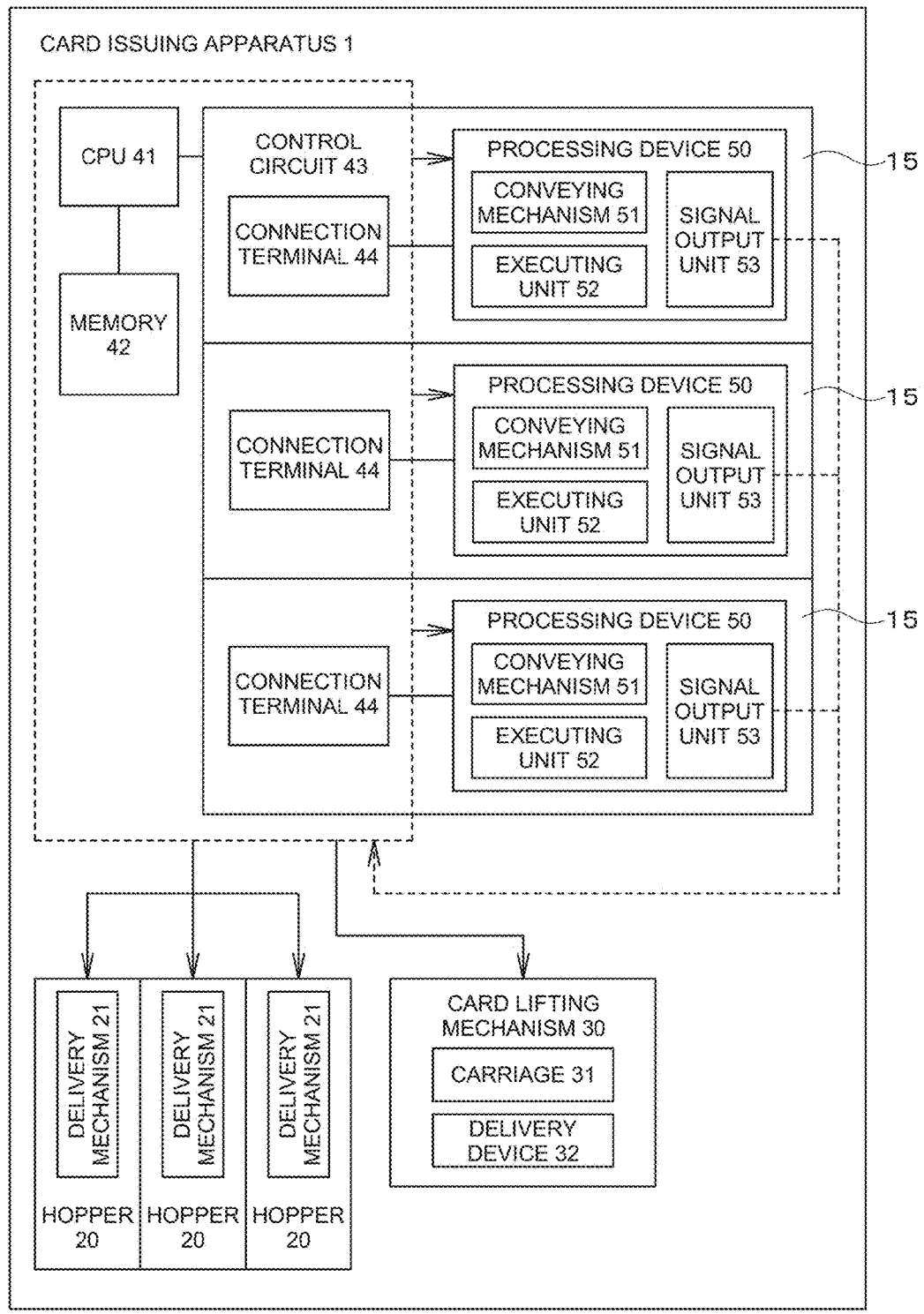
FIG. 3 is a block diagram illustrating the configuration of the card issuing apparatus 1 according to an embodiment of the present invention.
Figure 4:
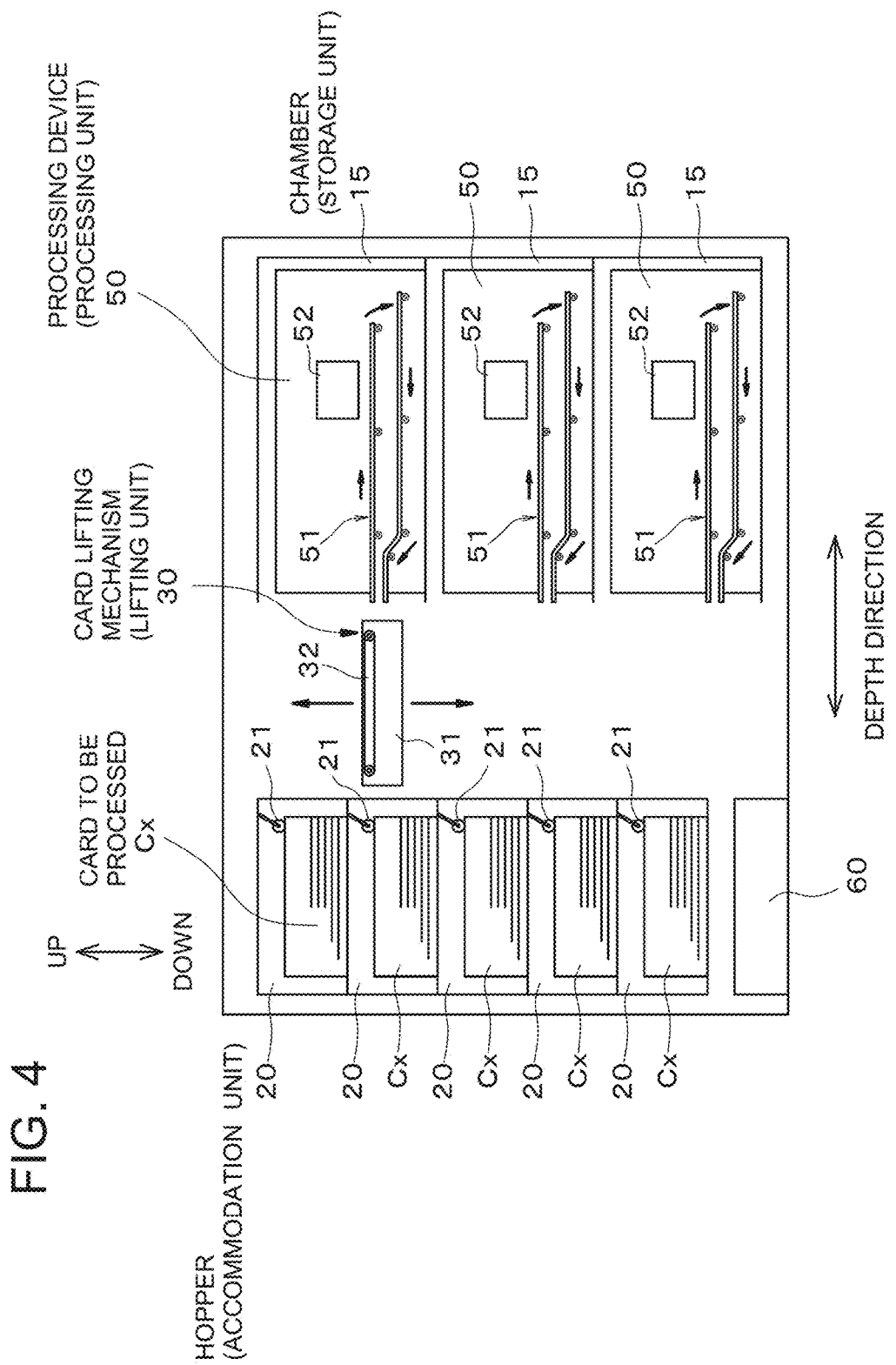
FIG. 4 is a conceptual diagram illustrating mechanisms in the card issuing apparatus 1 according to an embodiment of the present invention.
Figure 5:
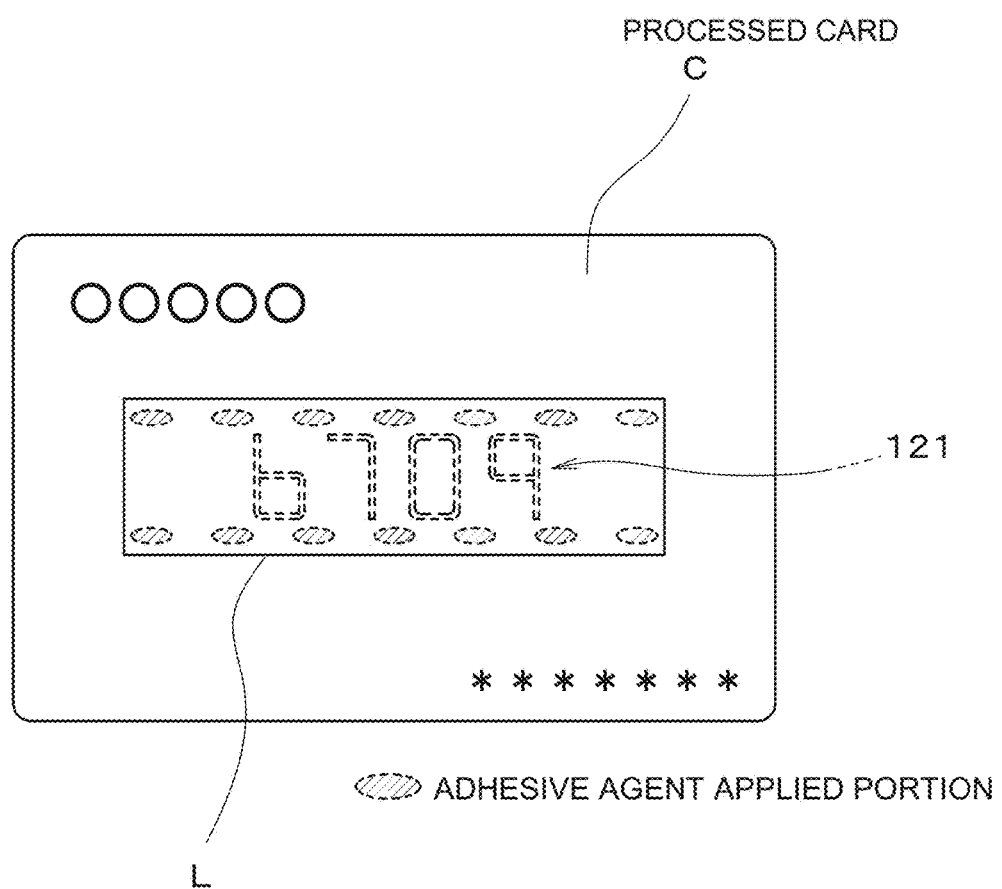
FIG. 5 is a diagram that describes attachment of a label L.
Figure 6:
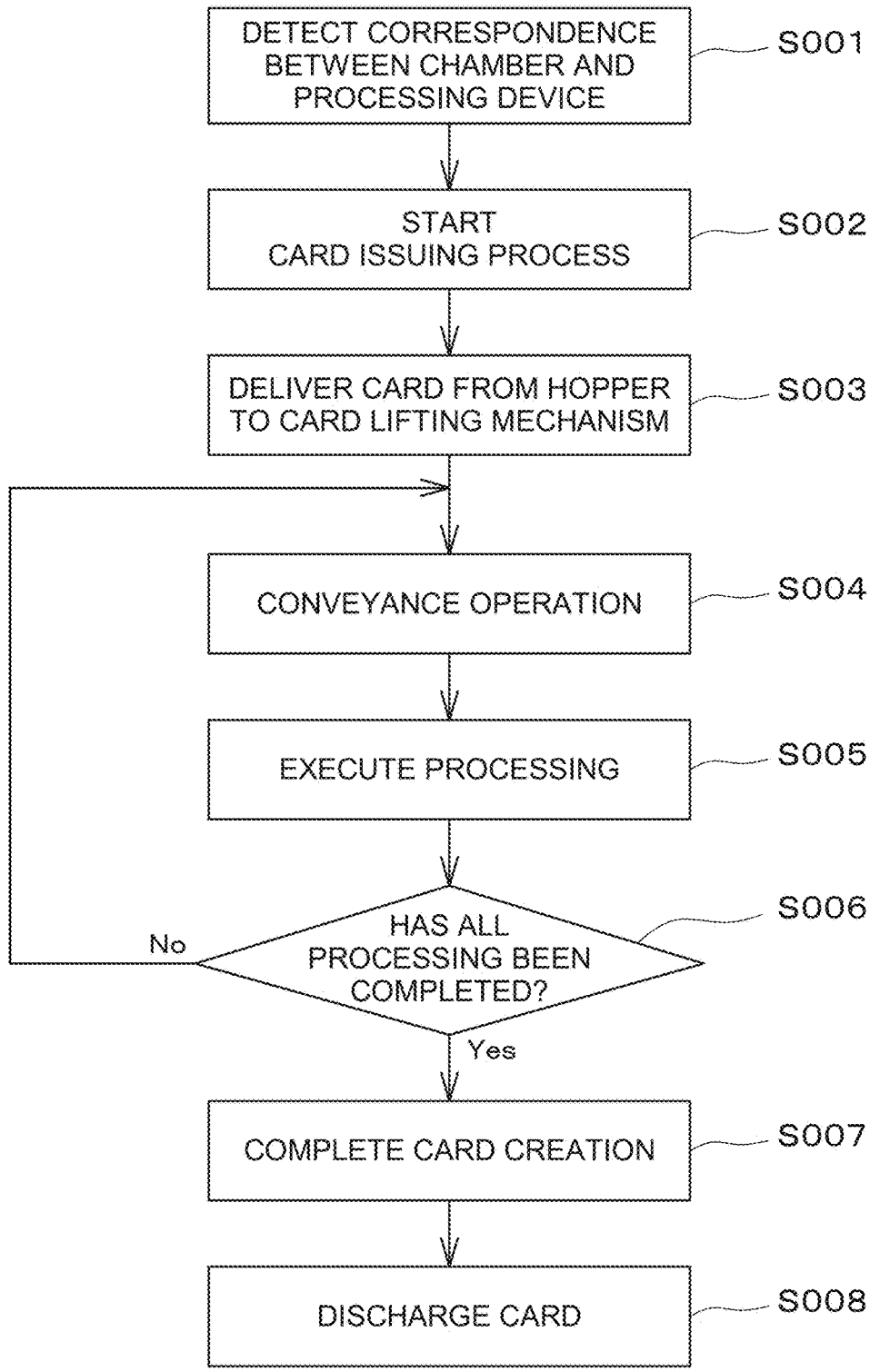
FIG. 6 is a diagram illustrating the flow of a card issuing process.
Figure 7:
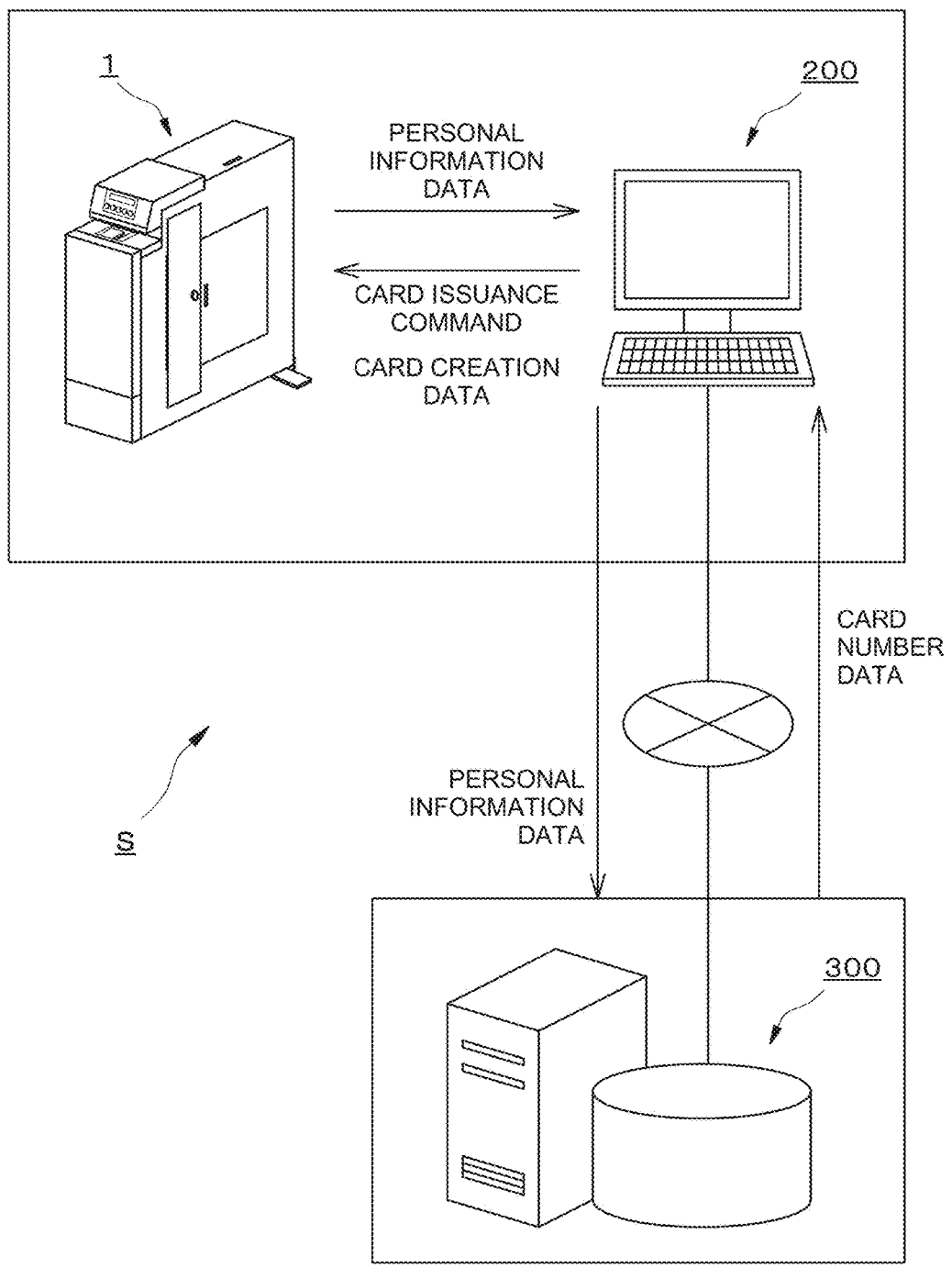
FIG. 7 is a conceptual diagram of an instant card issuing system S.
Figure 8A:
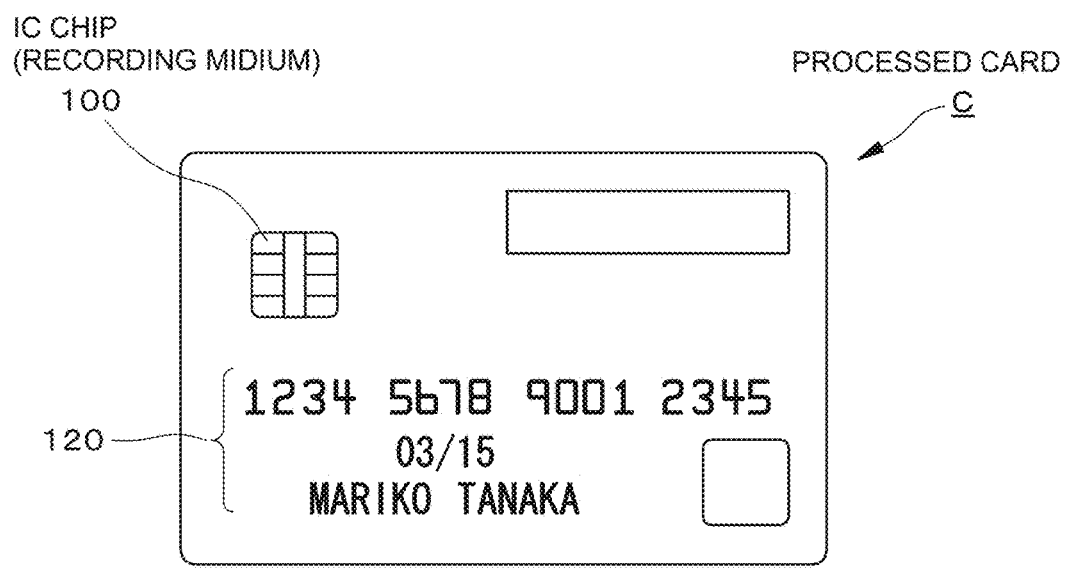
FIG. 8A is a diagram illustrating an example of a processed card C issued by the card issuing apparatus 1.
Figure 8B:
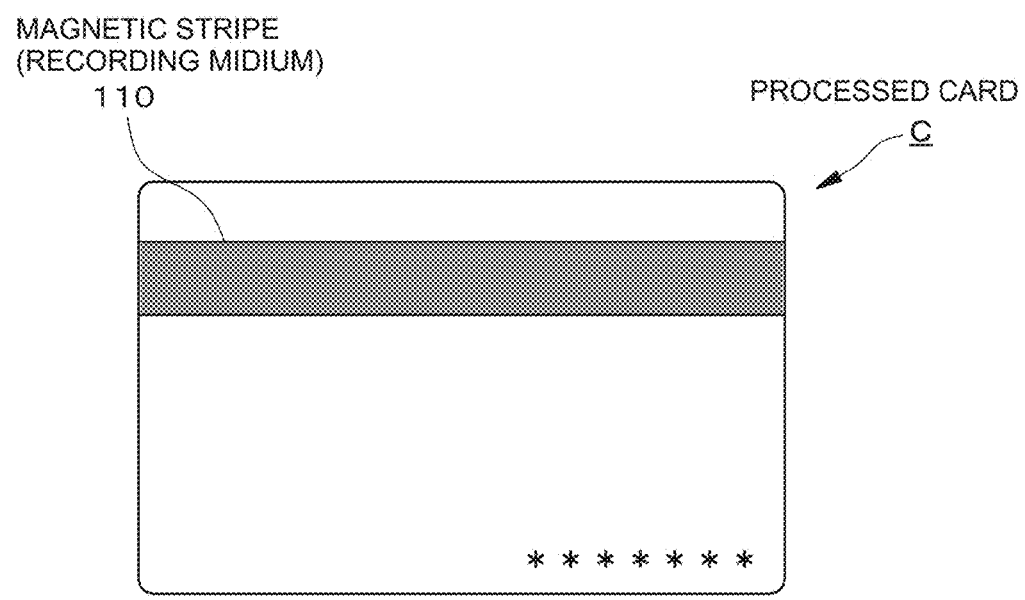
FIG. 8B is a diagram illustrating an example of the processed card C issued by the card issuing apparatus 1.
Figure 9:
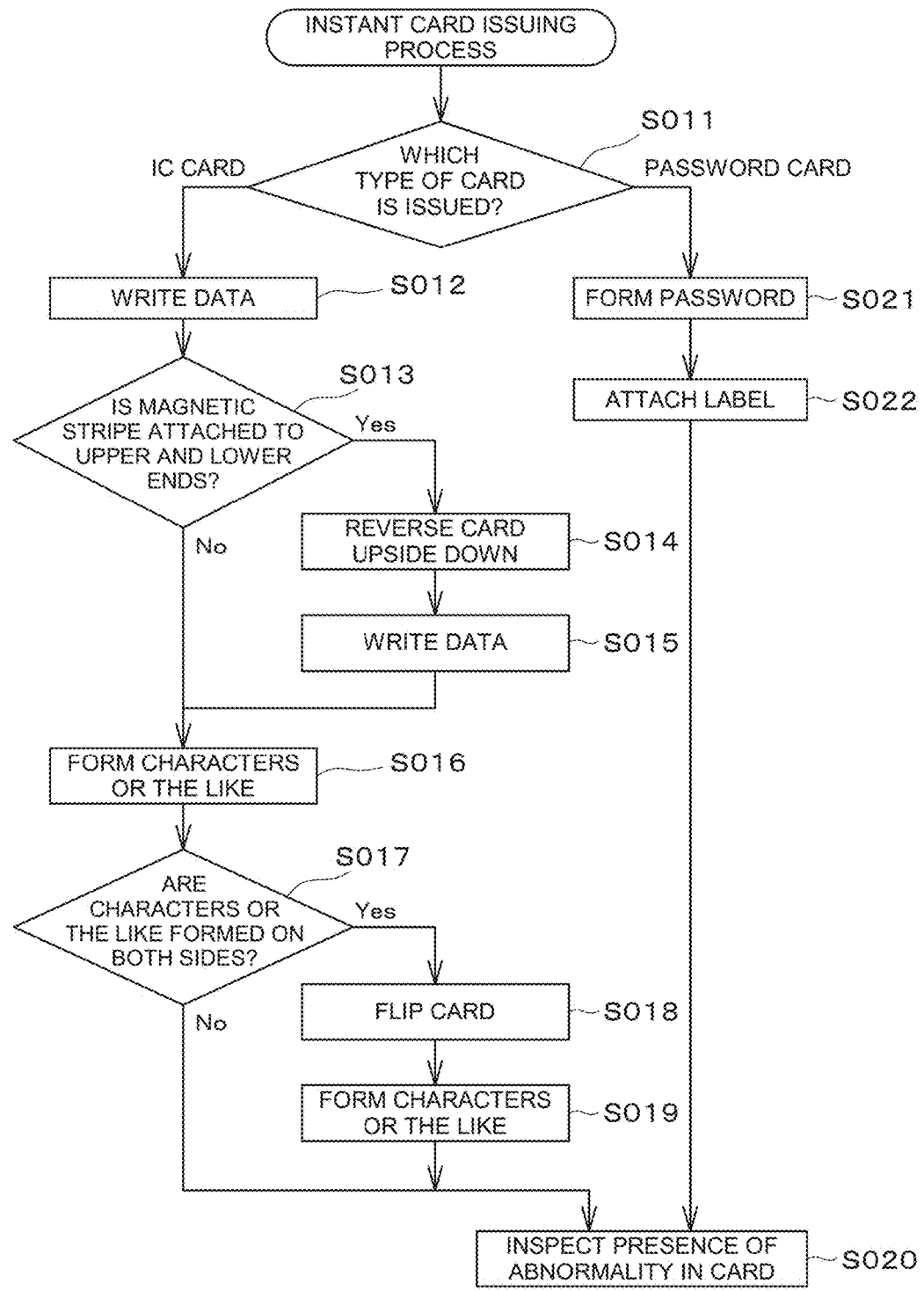
FIG. 9 is a diagram illustrating the flow of an instant card issuing process.
Figure 10:
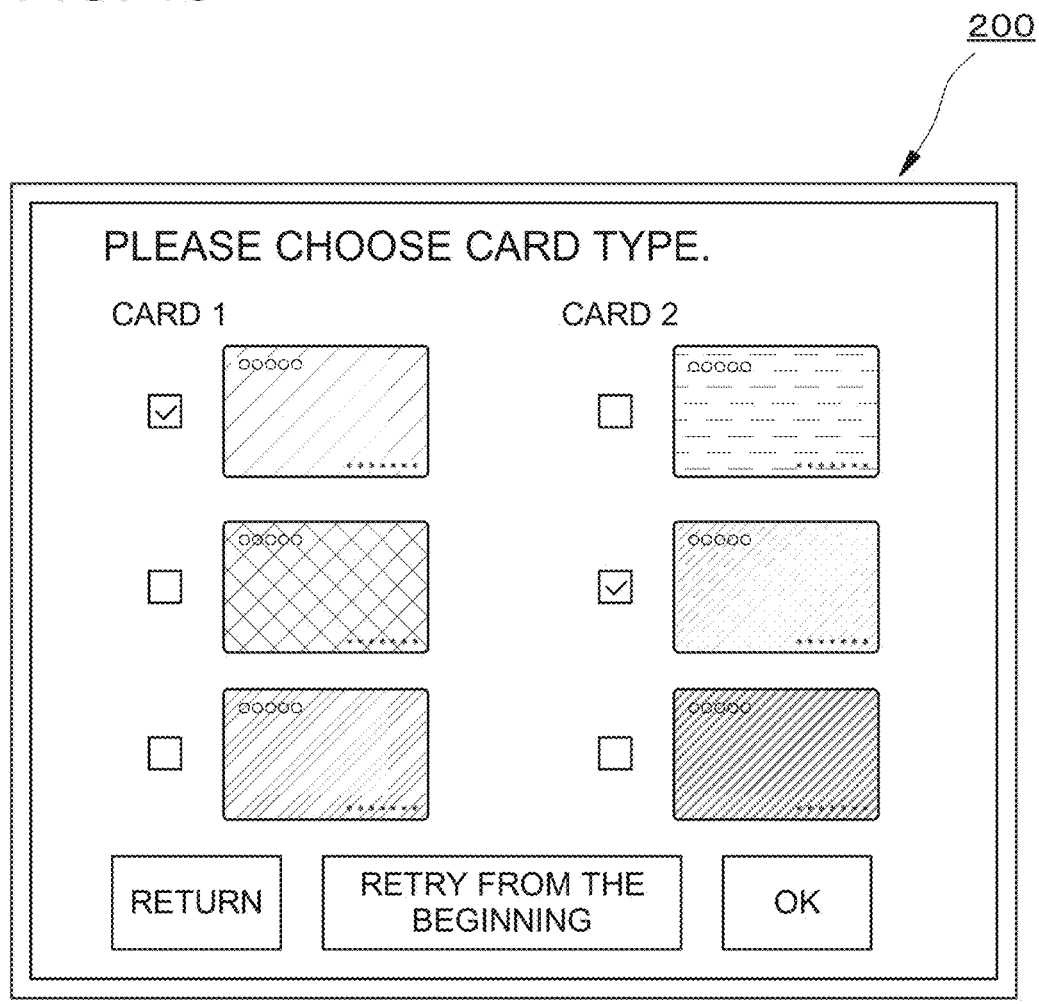
FIG. 10 is a diagram illustrating a display screen of a control terminal 200.

Hereinafter, a card issuing apparatus 1 according to an embodiment of the present invention (hereinafter referred to as the present embodiment) will be described with reference to FIGS. 1 to 10. FIG. 1 is a diagram illustrating a card issuing procedure. FIG. 2 is a schematic perspective view of the card issuing apparatus 1 according to the present embodiment. FIG. 3 is a block diagram illustrating the configuration of the card issuing apparatus 1 according to the present embodiment. FIG. 4 is a conceptual diagram illustrating mechanisms in the card issuing apparatus 1 according to the present embodiment. FIG. 5 is a diagram that describes attachment of a label L. FIG. 6 is a diagram illustrating the flow of a card issuing process. FIG. 7 is a conceptual diagram of an instant card issuing system S. FIGS. 8A and 8B are diagrams illustrating an example of a processed card C issued by the card issuing apparatus 1, in which FIG. 8A illustrates the front side of the processed card C, and FIG. 8B illustrates the rear side of the processed card C. FIG. 9 is a diagram illustrating the flow of an instant card issuing process. FIG. 10 is a diagram illustrating a display screen of a control terminal 200.

As illustrated in FIG. 1, a card issuing apparatus 1 according to the present embodiment is an apparatus that a card issuing company such as a bank or a credit card company possesses to issue a card applied for by a card user. More specifically, the card issuing apparatus 1 performs processing on a card Cx to be processed using processing devices 50 to be described later to create a processed card C, and issues the processed card C to the card user.

Here, the processed card C is a card in which predetermined processing has been completed, and in the present embodiment, is a card that is capable to be used by the card user (that is, ready to be handed to the card user). Moreover, the card Cx to be processed is a card in which processing has not been completed, and in the present embodiment, is a card in a state where data has not been written to an IC chip 100 or a magnetic stripe 110 (see FIGS. 8A and 8B) and a character string or a symbol representing information on a card number or the card user has not been printed or embossed on the card surface.

Moreover, in the present embodiment, the cards Cx to be processed are accommodated in a bunch in a hopper 20 (see FIG. 3) to be described later and are appropriately supplied according to the number of cards remaining in the hopper 20. The cards Cx to be processed in the state of being accommodated in the hopper 20 are in the state where graphics or illustrations corresponding to the type of card is printed in advance, and a recording medium such as the IC chip 100 or the magnetic stripe 110 is attached in advance to a predetermined position.

The configuration of the card issuing apparatus 1 according to the present embodiment will be described. As illustrated in FIGS. 2 and 3, a card issuing apparatus body 10, the hopper 20 as an accommodation unit, a card lifting mechanism 30 as a lifting unit, a controller 40 as a control unit, and a processing device 50 as a processing unit are included in the card issuing apparatus 1 as main constituent components.

The card issuing apparatus body 10 is a housing in which constituent components (specifically, the hopper 20, the card lifting mechanism 30, the controller 40, and the processing device 50) other than the card issuing apparatus body 10, in the above-described constituent components are mounted. Specifically, a space for mounting a plurality of processing devices 50 is formed in the card issuing apparatus body 10 according to the present embodiment. That is, the card issuing apparatus 1 according to the present embodiment includes a plurality of processing devices 50, and an equal number of chambers 15 to the number of processing devices 50 or more, as a storage unit configured to store only one processing device 50, are included in the card issuing apparatus body 10.

In the present embodiment, an equal number of chambers to the number of processing devices 50 or more are included in the card issuing apparatus body 10 in a state of being arranged in the up-down direction. More specifically, as illustrated in FIG. 2, a plurality of base plates 14 serving as a base when fixing the processing device 50 are provided at the inner side of the inner space of the card issuing apparatus body 10 to be arranged in the up-down direction. Each processing device 50 is stored in each space (that is, the chamber 15) partitioned by the base plates 14.

Moreover, the card issuing apparatus body 10 includes a plurality of openable doors as illustrated in FIG. 2. Specifically, a supply door 11 that opens to supply cards to the hopper 20 and a card dispensing door 12 that opens to dispense defective cards (for example, cards in which data has not been properly written to the IC chip 100) are provided on a front panel of the card issuing apparatus body 10. In addition, an inspection door 13 that opens to inspect the card lifting mechanism 30 is provided on a side panel of the card issuing apparatus body 10. Further, attachment/detachment doors 14A and 14B that open to attach or detach the processing device 50 to or from the card issuing apparatus body 10 are provided on the top panel and side panel of the card issuing apparatus body 10.

Furthermore, a discharge port 16 for discharging a finished card (that is, the processed card C), in which all processing in the apparatus has been performed, to the outside of the apparatus is formed in a portion of the top panel of the card issuing apparatus body 10, located closer to the front surface. In addition, in the present embodiment, the discharge port 16 also functions as an insertion port in which a personal information card such as a license card possessed by the card user is inserted when a process of loading the personal information card into the apparatus to specify personal information from the personal information card is performed in the apparatus. The personal information card inserted through the discharge port 16 into the apparatus is subjected to a predetermined processing and is then discharged outside the apparatus through the discharge port 16 again. However, the present invention is not limited to this; the personal information card may be dispensed outside the apparatus through the same collecting route as defective cards (that is, the card may be dispensed outside the apparatus through the card dispensing door 12 that is open.

The hopper 20 accommodates cards Cx to be processed in a bunch. The cards Cx to be processed accommodated in the hopper 20 are pulled out one by one by a delivery mechanism 21 (see FIG. 4) in response to the start of a card issuing process and is delivered from the hopper 20 to a carriage 31 to be described later. The delivery mechanism 21 according to the present embodiment includes a rotating roller and is configured to bring the rotating roller to make sliding contact with a card Cx to be processed at top of the bunch of cards Cx to be processed to pull out and deliver one card Cx to be processed by frictional force. However, the present invention is not limited to this, but another configuration may be adopted as long as the delivery mechanism 21 can pull out and deliver one card Cx to be processed from the bunch of cards Cx to be processed.

In the card issuing apparatus 1 according to the present embodiment, a plurality of hoppers 20 are arranged in the up-down direction as illustrated in FIG. 2. In the present embodiment, the plurality of hoppers 20 include hoppers 20 that accommodate different types of cards Cx to be processed.

More specifically, the card issuing apparatus 1 according to the present embodiment can issue plural types of processed cards C such as a credit card, a cash card, or an Internet banking card. That is, in the card issuing apparatus 1 according to the present embodiment, plural types of cards Cx to be processed are accommodated in the hoppers 20 so that the type of processed cards C to be issued (that is, cards Cx to be processed that are subjected to processing) is changed according to the content of the user's application. When processing corresponding to the type is performed on each of the plural types of cards Cx to be processed, plural types of processed cards C are created.

Further, in the present embodiment, the hopper 20 is provided for each type of cards Cx to be processed. In this manner, when a card Cx to be processed is dispensed from the hopper 20 in order to issue a type of card (processed card C) corresponding to the content of the application of the card user, the card Cx to be processed may be dispensed from the hopper 20 corresponding to the type.

The card lifting mechanism 30 is configured to receive the cards Cx to be processed from the hoppers 20 and convey the received cards Cx to be processed in the up-down direction to be delivered to the processing devices 50. The card lifting mechanism 30 is provided inside the card issuing apparatus body 10. More specifically, as illustrated in FIG. 2, the card lifting mechanism 30 is provided between the hopper 20 and the chamber 15 in a depth direction of the card issuing apparatus body 10.

As illustrated in FIG. 4, the card lifting mechanism includes the carriage 31 that moves in the up-down direction while holding the card Cx to be processed, a driving mechanism (not illustrated) that moves the carriage 31 in the up-down direction, and a delivery device 32 that operates in order to deliver the card Cx to be processed on the carriage 31 to the processing device 50. When one card Cx to be processed is dispensed from the hopper 20, the card lifting mechanism 30 having such a configuration conveys the card Cx to be processed in the up-down direction by allowing the carriage 31 to receive the card Cx to be processed on the upper surface of the card lifting mechanism 30 and moving up and down with the card Cx to be processed placed on the upper surface. The delivery device 32 operates when the carriage 31 arrives at the position in the up-down direction, of the processing device 50 which is a delivery destination, and the card Cx to be processed on the carriage 31 is delivered to a predetermined processing device 50.

In the present embodiment, when the processing of the respective processing devices 50 ends, the card lifting mechanism 30 receives cards Cx to be processed from the respective processing devices 50 again and conveys the cards Cx to be processed to the position in the up-down direction, of the processing device 50 that performs the next processing. In this manner, in the present embodiment, after the card lifting mechanism 30 delivers the card Cx to be processed to one processing device 50 of the plurality of processing devices 50 and the processing of the processing device 50 is executed, the card lifting mechanism 30 receives the card Cx to be processed again from the processing device 50 and conveys the card Cx to be processed that has been received from the processing device 50 in the up-down direction in order to deliver the card Cx to be processed to another processing device 50 (so that the card Cx to be processed is delivered for the next processing step). Finally, a card (that is, the processed card C) to which all processing in the apparatus has been performed is delivered to the card lifting mechanism 30 and is conveyed to one end (for example, the upper end) of a conveyance path by the card lifting mechanism 30. After that, the processed card C is discharged outside the apparatus through the discharge port 16 by a discharge mechanism (not illustrated).

The processing device 50 is a device that executes predetermined processing on the card Cx to be processed in order to create the processed card C, and as described above, in the present embodiment, a plurality of processing devices 50 are mounted in the card issuing apparatus body 10. Hereinafter, devices that can be mounted in the card issuing apparatus body 10 as the processing devices 50 will be described.

Examples of the first processing device 50 include devices such as a printer, an embosser, or an indenter, which execute a process of forming at least one of a character string and a symbol on the surface of the card Cx to be processed. These devices correspond to the first processing unit and form a character string or a symbol that represents a card number, a card expiration date, a card user name, and the like according to the data sent from the control terminal 200 to be described later on the card surface.

The printer is one that prints a character string or a symbol on the card surface using ink, toner, or the like, the embosser is one that marks a character string or a symbol on the card surface by embossing, and the indenter is one that marks and types a character string or a symbol on the card surface by indenting. Which device of the devices will be used as the first processing device 50 is determined according to the type of cards (processed cards C) to be issued, the content represented by the character string or the symbol formed on the card surface, and the like. For example, when a credit card is issued, the indenter is surely used.

Examples of the second processing device 50 include devices such as an IC writer or an encoder, that execute a process of writing information on a recording medium such as the IC chip 100 or the magnetic stripe 110, included in the card Cx to be processed. These devices correspond to the second processing unit and write digitalized information (data) such as a card number, a card expiration date, or a password, according to the data sent from the control terminal 200 to be described later. Which device of the devices will be used as the second processing device 50 is determined according to the type of the recording medium included in the card. For example, when a non-contact IC card is issued, a writer dedicated for the non-contact IC card is used. Moreover, a combined machine that includes both functions of the IC writer and the encoder may be used.

Examples of the third processing device 50 include devices such as a labeler or a sealer, that execute a process of attaching a label L (for example, see FIG. 5) or a seal on the surface of the card Cx to be processed to cover the character string or the symbol formed on the surface of the card Cx to be processed by the first processing device (specifically, a printer). These devices correspond to the third processing unit and attaches the label L or the like as a cover member that covers a predetermined character string to a region of the card surface on which the character string is formed for security when the predetermined character string is printed by the printer, for example. Here, an example of the character string covered by the label L or the like is a character string that represents a password (used for Internet banking) printed on an Internet banking card, for example.

As the label L that the third processing device 50 attaches on the card surface, an adhesive sheet in which an adhesive agent is applied to the entire rear surface is generally used. The label L is removed by the card user after the card is delivered to the card user, and the character string or the symbol which has been covered is perceived by the card user. Thus, in the present embodiment, unlike a normal label attaching method, as illustrated in FIG. 5, an adhesive agent (for example, a hot-melt agent) used for attaching the label L or the like to the card surface is applied in a dot shape to positions away from the formation position of the character string or the symbol covered by the label L or the like. With such an adhesive agent application method, it is possible to prevent the character string or the symbol (specifically, the character string or the symbol formed by printing) from being blurred as a result of the removal of the label L. In this respect, the method of attaching the label L employed in the present embodiment is more suitable than the normal method.

Examples of the fourth processing device 50 include devices that execute a process of switching the posture of the card Cx to be processed. Here, the switching of the posture of the card Cx to be processed means flipping the card Cx to be processed within the apparatus or reversing the same upside down.

The card Cx to be processed is flipped, for example, when printing is performed on the front surface of the card Cx to be processed and subsequently on the rear surface. That is, after printing is executed by the printer, when the card Cx to be processed is flipped to execute printing using the printer again, both-side printing can be performed on the card Cx to be processed.

The card Cx to be processed is reversed upside down, for example, when magnetic stripes 110 are attached to both upper and lower end portions of the front surface of the card Cx to be processed, and a process of writing data to the respective magnetic stripes 110 is executed. That is, after data is written to one magnetic stripe 110 by the encoder, when the card Cx to be processed is reversed upside down, and the writing process is executed by the encoder again, data is also written to the other magnetic stripe 110. As a result, it is not necessary to provide encoders individually for the upper and lower magnetic stripes 110, and it is possible to write data to the respective upper and lower magnetic stripes 110 using only one encoder.

As for the device that executes the process of switching the posture of the card Cx to be processed, the device may be solely attached to the card issuing apparatus body 10. However, another configuration may be employed such that a posture switching device is attached in the printer or the encoder as one of the constituent components. That is, a mechanism for switching the posture of the card Cx to be processed may be integrated into the first processing device 50 or the second processing device 50.

Examples of the fifth processing device 50 include devices such as an image processing device or a verification processing device, that execute an inspection process for selecting defective cards. These devices check cards to which all processing except for image processing or verification processing has been performed to determine the presence of defects (printing or embossing errors) in appearance or abnormality in data written to a recording medium. Cards (the processed cards C) determined to be normal are conveyed up to a predetermined position (one end of the conveyance path) after being delivered to the card lifting mechanism 30, and are then discharged outside the apparatus through the discharge port 16. Meanwhile, cards determined to be defective are collected in a reject box 60 by a collecting mechanism (not illustrated). The defective cards collected in the reject box 60 are dispensed outside the apparatus from the card dispensing door 12 and are finally discarded.

The image processing device as the fifth processing device 50 may execute a process of reading a personal information card possessed by the card user, inserted into the apparatus through the discharge port 16 to acquire personal information of the card user in addition to executing the process of inspecting a printing state of a card created in the card issuing apparatus 1.

In the present embodiment, all constituent components of the processing devices 50 described above are integrated into a unit and are detachably attached to the card issuing apparatus body 10. That is, in the present embodiment, the respective processing devices 50 are configured as one module and can be detachably fixed to the card issuing apparatus body 10 by bolts or screws. In this manner, the respective processing devices 50 can be easily attached to and detached from the card issuing apparatus body 10.

Further, as described above, in the card issuing apparatus body 10, a plurality of chambers 15 that store the processing devices 50 are arranged in the up-down direction. Thus, in the card issuing apparatus 1 according to the present embodiment, the plurality of processing devices 50 are fixed to the card issuing apparatus body 10 to be arranged in the up-down direction. That is, in the present embodiment, since the plurality of processing devices 50 are fixed to the card issuing apparatus body 10 in a state of being arranged vertically, it is possible to reduce the installation area as compared to a configuration in which the plurality of processing devices 50 are arranged horizontally. That is, the installation space of the card issuing apparatus 1 is reduced, and the inner space of the store or the like in which the card issuing apparatus 1 is installed can be effectively utilized.

There are various combinations of the processing devices 50 included in the card issuing apparatus 1 depending on the type of cards (processed cards C) to be issued or the specification of the card issuing apparatus 1 itself. Meanwhile, of the processing devices 50, the processing device 50 (that is, the processing device 50 corresponding to the first processing unit) such as a printer, an embosser, or an indenter and the processing device (that is, the processing device 50 corresponding to the second processing unit) such as an IC writer or an encoder are processing devices 50 that are essential to the card issuing apparatus 1. That is, which devices of the various types of processing devices 50 will be mounted in the apparatus as the combination of the processing devices 50 included in the card issuing apparatus 1 can be freely designed according to the needs of a card issuing company which is the apparatus user as long as the combination includes at least the essential processing devices 50 (that is, the first and second processing units). In other words, due to the configuration of the card issuing apparatus 1 according to the present embodiment, the degree of freedom in the combination of the processing devices 50 is improved as compared to the conventional apparatus.

Further, as described above, in the present embodiment, since the respective processing devices 50 can be easily attached to and detached from the card issuing apparatus body 10, it is possible to easily adapt to a case of changing the combination of the processing devices 50 even after the card issuing apparatus 1 is installed.

Moreover, as described above, the processing devices receive the card Cx to be processed from the card lifting mechanism 30, execute respective processing on the card Cx to be processed, and then, deliver the processed card to the card lifting mechanism 30 again.

The movement of the card in the respective processing devices 50 will be described with reference to FIG. 4. The card Cx to be processed delivered from the card lifting mechanism 30 to the processing device 50 is conveyed toward an executing unit 52 that executes processing of the processing device 50 along a conveyance path formed in the processing device 50 by a conveying mechanism 51 that is provided in the processing device 50. A predetermined processing is performed on the card Cx to be processed when the card Cx to be processed passes under the executing unit 52, and the processed card is continuously conveyed along the conveyance path, and as illustrated in FIG. 4, is returned to a position where the card is delivered from the card lifting mechanism 30 to the processing device 50. At that position, the processed card is delivered again to the card lifting mechanism 30.

In this manner, in the present embodiment, the card lifting mechanism 30 delivers the card Cx to be processed to one of the plurality of processing devices 50 and receives the card Cx to be processed from the processing unit after the processing device 50 executes processing on the card Cx to be processed. Moreover, the card lifting mechanism 30 conveys the card Cx to be processed that has been received from the processing device 50 in the up-down direction in order to deliver the same to another processing device 50. That is, in the card issuing apparatus 1 according to the present embodiment, after the card Cx to be processed is processed by the respective processing devices 50 is completed, the card Cx to be processed is returned to the card lifting mechanism 30 and is conveyed by the card lifting mechanism 30 to be subjected to the next processing step. In this manner, even when the combination of the processing devices 50 is changed, it is not necessary to change the card conveyance path, and a card conveyance path that is flexible to a variation in the combination is included in the apparatus.

When the plurality of processing devices 50 include the processing device 50 (the processing device 50 corresponding to the third processing unit, hereinafter referred to a labeler or the like) such as a labeler or a sealer, the card lifting mechanism 30 delivers the card Cx to be processed to the processing device 50 (the processing device 50 corresponding to the first processing unit, hereinafter referred to as a printer or the like) such as a printer and receives the card Cx to be processed again from the printer or the like after the printer or the like executes processing on the card to be processed. Moreover, the card lifting mechanism 30 conveys the card Cx to be processed that has been received from the printer or the like in the up-down direction in order to deliver the same to the labeler or the like. In this manner, it is possible to reduce the installation space of the card issuing apparatus 1 that issues a card (the processed card C) in which a label L or a seal is attached to conceal a printed character string, for example. Moreover, the degree of freedom in the combination of the processing devices 50 is improved according to the user's needs, and the card conveyance path capable of flexibly adapting to a variation in the combination is included in the apparatus.

The controller 40 controls the respective units (specifically, the delivery mechanism 21 in the hopper 20, the card lifting mechanism 30, and the processing devices 50) of the card issuing apparatus 1 to perform a card issuing process. As illustrated in FIG. 3, the controller 40 includes a CPU 41, a memory 42, and a control circuit 43. A control program (that is, a device driver) is installed in the memory 42. Moreover, the controller 40 can communicate with the control terminal 200 through a communication interface (not illustrated). Upon receiving a card issuance command and card creation data sent from the control terminal 200, the controller 40 controls the respective units of the card issuing apparatus 1 with the aid of the control circuit 43 to perform a card issuance process.

More specifically, the card issuing apparatus 1 is connected to a power supply (not illustrated), and the power of the power supply is supplied to the respective units of the card issuing apparatus 1 through the control circuit 43. In addition, the control circuit 43 includes a connection terminal 44 that is connected to the processing device 50. The connection terminal 44 is provided in each of the chambers 15. When the processing device 50 stored in the chamber 15 is connected to the connection terminal 44, the processing device 50 and the control circuit 43 are electrically connected by the connection terminal 44 (that is, power can be supplied to the processing device 50).

Meanwhile, each processing device 50 includes a signal output unit 53 that outputs a signal for identifying the processing device 50 when the processing device 50 is connected to the connection terminal 44 in the chamber 15. Upon receiving a signal from the signal output unit 53, the controller 40 can recognize which processing device 50 of the plurality of processing devices 50 is stored in each chamber 15 based on the received signal. This recognizing process is executed for each chamber 15 in which the processing device 50 is stored. In this manner, the controller 40 can understand the correspondence between the chamber 15 and the processing device 50 stored in the chamber 15.

The controller 40 controls the card lifting mechanism 30 based on the correspondence so that the card Cx to be processed is conveyed to the position in the up-down direction, of the chamber 15 in which the processing device 50 that receives the card Cx to be processed is stored. In this manner, in the card issuing apparatus 1, the card (the card Cx to be processed) can be appropriately conveyed based on the correspondence between the chamber 15 and the processing device 50 according to the control of the controller 40. As a result, cards are appropriately conveyed so that processing is performed on the cards in a well-ordered manner.

In the present embodiment, as described above, it is possible to freely set the combination of the processing devices 50 and to freely select the chamber 15 that stores each of the processing devices 50. Meanwhile, when the processing device 50 in the chamber 15 is connected to the connection terminal 44, the signal for identifying the processing device 50 is sent from the processing device 50 to the controller 40. The controller 40 having received the signal recognizes which processing device 50 is stored in each of the chambers 15 based on the signal. In this manner, the controller 40 can understand the position (installation position) of each of the processing devices 50 in the up-down direction, and the card lifting mechanism 30 can appropriately convey the card Cx to be processed so that the card Cx to be processed is delivered to the respective processing devices 50 in a well-ordered manner under the control of the controller 40.

Next, the card issuing process performed according to the control of the controller 40 will be described with reference to FIG. 6. Before the card issuing process is performed, the controller 40 detects the correspondence (that is, which processing device 50 is stored in which chamber 15) between the chamber 15 and the processing device 50 (S001).

After that, when the controller 40 receives a card issuance command and card creation data from the control terminal 200, the card issuing process starts (S002). The controller 40 analyzes the card creation data and controls the respective units of the card issuing apparatus 1. First, the controller 40 specifies the type of card to be issued from the card creation data and allows the delivery mechanism 21 to dispense one card Cx to be processed from the hopper 20 corresponding to the type and deliver the same to the card lifting mechanism 30 (S003).

Subsequently, the controller 40 controls the card lifting mechanism 30 to move the card Cx to be processed up to the position of the chamber 15 in which the processing device 50 that executes the first processing is stored (S004). When the carriage 31 arrives at the position, the card Cx to be processed is delivered from the card lifting mechanism 30 to the processing device 50 that executes the first processing. After that, the controller 40 controls the processing device 50 that executes the first processing so that the first processing is executed on the card Cx to be processed (S005).

After the first processing is executed, the card Cx to be processed is returned to the card lifting mechanism 30 again by the conveying mechanism 51 of the processing device 50. After that, the controller 40 alternately repeats the conveying operation of the card lifting mechanism 30 and the process executing operation of the processing device 50 based on the card creation data until all processing is completed (S006). The controller 40 determines whether a card has been completed when all processing has been completed (S007). An inspection process for inspecting the presence of abnormality in the card is executed as the final processing of the card issuing process, and defective cards are collected in the reject box 60. In contrast, normal cards are processed in the following procedure.

After all processing has been completed, the controller 40 allows the card lifting mechanism 30 to convey the completed card (the processed card C) up to one end (upper end) of the conveyance path and allows a discharge mechanism (not illustrated) to discharge the processed card C outside the apparatus through the discharge port 16 (S008). The card issuing process ends when the operation of discharging the processed card C ends.

Next, an embodiment of a card issuing system that includes the card issuing apparatus 1 described above as a constituent component will be described with reference to FIGS. 7 to 10. The card issuing system according to the present embodiment is a system (hereinafter referred to an instant card issuing system S) that can instantly issue cards when a card user applies for a card. More specifically, the instant card issuing system S can instantly issue a processed card C (hereinafter referred to as an IC card) illustrated in FIGS. 8A and 8B and a processed card C (a card on which password is recorded, hereinafter referred to as a password card) illustrated in FIG. 5 according to an application of a card user.

As illustrated in FIGS. 8A and 8B, the IC card includes an IC chip 100 on its front surface and a magnetic stripe 110 on its rear surface. The magnetic stripe 110 is not limited to a configuration in which one magnetic stripe is provided on the upper side, but the magnetic stripes may be provided on both upper and lower sides. In addition, on the front surface of the IC card, a printed character string 120 representing a card number, a card expiration date, and a card user name is formed by a printer. These items of character information are not limited to those printed by a printer but may be embossed by an embosser or may be indented by an indenter. A plurality of designs may be prepared for the IC card, and the card user may select a card to be issued of these types of cards during card application.

The password card is issued together with the IC card, and as illustrated in FIG. 5, a printed character string 121 representing a password is formed on the rear surface, and the label L that covers the printed character string 121 is attached thereon. A plurality of designs may be prepared for the password card, and the card user may select a card to be issued from these types of cards during card application.

As a configuration for instantly issuing the above two cards, as illustrated in FIG. 7, the instant card issuing system S includes the card issuing apparatus 1, the control terminal 200, and a system server 300. As described above, the card issuing apparatus 1 is installed in a store of a card issuing company.

The control terminal 200 is installed in a store of a card issuing company similarly to the card issuing apparatus 1. The control terminal 200 can communicate with the card issuing apparatus 1, and is configured to generate a card issuance command and card creation data according to an application of a card user and send these items of data to the card issuing apparatus 1.

Specifically, when the card user performs the process of applying for cards at the store of a card issuing company, the card user performs an input operation corresponding to the application content while viewing the display screen of the control terminal 200. For example, as illustrated in FIG. 10, the selectable types of IC card and password card are presented on the display screen of the control terminal 200, and the card user chooses a desired card type on the control terminal 200. The input operation may be performed by an employee of the card issuing company instead of the card user.

When all input operations are completed, the control terminal 200 requests the card user to present a personal information card on the display screen. The card user receiving the request inserts the personal information card into a predetermined card reader according to the instructions displayed on the display screen. In the present embodiment, a device that reads the personal information card to acquire the personal information of the card user is installed in the card issuing apparatus 1, and the card user inserts the personal information card into the device through the discharge port 16 (see FIG. 2). When the personal information card is read in the card issuing apparatus 1, electronic data representing the personal information is generated, and the electronic data is sent from the card issuing apparatus 1 to the control terminal 200. Upon receiving the electronic data, the control terminal 200 generates card creation data based on the received data and the contents input by the card user while the card user views the display screen.

The system server 300 is installed in a center different from the store of the card issuing company and can communicate with the control terminal 200 through the Internet. The system server 300 receives the data representing the personal information of the card user, received by the control terminal 200 from the card issuing apparatus 1, from the control terminal 200 and examines the allowability of card issuance based on the data. When it is decided to allow the card issuance, the system server 300 selects a card number and sends data representing the selected card number to the control terminal 200. The control terminal 200 having received the data incorporates the data representing the card number into the card creation data during the generation of card creation data.

In the present embodiment, although the control terminal 200 generates the card creation data, the present invention is not limited to this. For example, after the input operation of the card user is received by the control terminal 200, the system server 300 may generate the card creation data based on the data representing the input contents and the data representing the personal information acquired by the card issuing apparatus 1 reading the personal information card.

Next, the flow of instantly issuing cards in the instant card issuing system S having such a configuration, specifically the flow in which the processing of the processing devices 50 is executed in the card issuing apparatus 1 will be described. Hereinafter, the flow will be described for each type of cards.

First, the flow of instantly issuing an IC card (that is, the case where "IC card" is selected as the card type in S011 in FIG. 9) will be described. After a card Cx to be processed corresponding to the IC card is supplied from the hopper 20, a process of writing data to the IC chip 100 or the magnetic stripe 110 of the card Cx to be processed is executed as an initial process (S012). Here, when the magnetic stripe 110 is attached to each of the upper and lower ends of the card Cx to be processed (Yes in S013), the card Cx to be processed is reversed upside down (S014) after executing the writing process (specifically, a writing process of the encoder), and the writing process is executed again (S015).

Subsequently, the card Cx to be processed to which the writing process has been performed is subjected to a process of forming a character string or a symbol representing a card number or the like on the card surface (S016). Here, when the character string or the symbol is formed on both the front and rear surfaces of the card Cx to be processed (Yes in S017), the card Cx to be processed is flipped (S018) after executing the process of forming the character or the like, and then the process of forming the character or the like is executed again (S019). Since the embossing speed of the embosser is slower than the printing speed of the printer, in the process of instantly issuing cards, which focuses on the processing speed, it is preferable to execute the process of forming characters or the like using a printer.

Subsequently, the card Cx to be processed to which the process of writing data and the process of forming characters or the like have been performed is subjected to an inspection process of inspecting the presence of abnormality in cards (S020). A card (that is, the processed card C) that is determined not to be abnormal in the inspection process is discharged outside the apparatus as a normal product and is delivered to the card user. Meanwhile, a card that is determined to be abnormal is collected in the reject box 60 as a defective product. By the above flow, instant IC card issuance is realized.

Next, the flow of instantly issuing a password card (that is, the case where "password card" is selected as the card type in S011 in FIG. 9) will be described. After a card Cx to be processed corresponding to the password card is supplied from the hopper 20, a process of forming a character string representing a password on the surface of the card Cx to be processed is executed as an initial process (S021). Since the character string is covered by the label L in the subsequent process, from the perspective of security, it is preferable that the character string (that is, the printed character string 121) be printed by a printer. However, the present invention is not limited to this, and a character string representing a password may be formed by an embosser, an indenter, or the like.

Subsequently, the card Cx to be processed on which the character string representing the password is formed is subjected to a process of attaching the label L on the card surface in order to cover the formation portion of the character string (S022). After that, similarly to the IC card, an inspection process of inspecting the presence of abnormality in the card is executed (S020). A card (that is, the processed card C) that is determined not to be abnormal in the inspection process is discharged outside the apparatus as a normal product and is delivered to the card user. Meanwhile, a card that is determined to be abnormal is collected in the reject box 60 as a defective product. By the above flow, instant password card issuance is realized.

Other Embodiment

In the above embodiments, the card issuing apparatus 1 according to the present invention has been mainly described. However, the above embodiments are provided to facilitate the understanding of the present invention and are not intended to limit the present invention. The present invention can be changed and modified without departing from the spirit thereof, and equivalents thereof also fall within the scope of the present invention.

Specifically, the flow of executing the processes of the respective processing devices 50, described in the above embodiments in relation to the card issuing process is merely an example. Another flow different from the above flow may be adopted, and part of the processes may be omitted. Further, the processing device 50 or the like (for example, the processing device 50 that records biometric authentication information on a predetermined portion of a card) having a function other than those of the processing devices 50 (the first processing device 50 to the fifth processing device 50) may be installed in the card issuing apparatus 1.

In addition, in the above embodiments, the card issuing apparatus 1 capable of issuing plural types of cards has been described. That is, in the above embodiments, the card issuing apparatus 1 capable of issuing plural types of cards, having a configuration in which the installation space is reduced, the degree of freedom in the combination of the processing devices 50 is improved according to the user's needs, and a card conveyance path capable of flexibly adapting to a variation of the combination is included in the apparatus has been described. However, the present invention is not limited to this, and the card issuing apparatus 1 that issues a single type of card can be applied to the present invention.

Further, in the above embodiments, a device that reads a personal information card possessed by the card user to acquire the personal information of the card user is installed in the card issuing apparatus 1. However, the present invention is not limited to this, a device that reads the personal information card to acquire the personal information of the card user may be provided as a device independent from the card issuing apparatus 1.

Furthermore, in the above embodiments, although the card Cx to be processed is supplied (delivered) to the card lifting mechanism 30 from the hopper 20 only, the present invention is not limited to this. For example, the card Cx to be processed may be supplied by inserting the same through the discharge port 16 in addition to supplying the same from the hopper 20.

In addition, in the above embodiments, a case where a new card is issued according to the application of the card user has been described. That is, in the above embodiments, although the card issuing apparatus 1 in which predetermined processing is executed on the card Cx to be processed, in which no data is written to the IC chip 100 and the magnetic stripe 110, and no character or symbol is printed or embossed on the card surface, to issue the processed card C has been described, the present invention is not limited to this. For example, like a device that overwrites or updates data to the IC chip 100 of the IC card possessed by the card user and a device that attaches a recording medium such as the IC chip 100 or the magnetic stripe 110 to the card possessed by the card user to record information on the recording medium, a card issuing apparatus that performs predetermined processing on a card which has been issued, as a card to be processed, can be applied to the present invention.

Furthermore, in the above embodiments, the card issuing apparatus 1 that issues a card (IC card) having the IC chip 100 and the magnetic stripe 110 on the front and rear surfaces thereof and a card (password card) having a character string representing a password formed on the rear surface has been described as an example. However, the above-described card types are merely examples of the card types issued by the card issuing apparatus 1, and other types of cards may be included. For example, an IC card in which the magnetic stripe 110 is attached to the rear surface or both the front and rear surfaces of the card, an IC card in which the magnetic stripe 110 is attached to the front surface or both the front and rear surfaces of the card, and a password card in which a character string representing a password is formed on the front surface or both the front and rear surfaces of the card may be included.

REFERENCE NUMERALS

1 CARD ISSUING APPARATUS
10 CARD ISSUING APPARATUS BODY
11 SUPPLY DOOR
12 CARD DISPENSING DOOR
13 INSPECTION DOOR
14A, 14B ATTACHMENT/DETACHMENT DOOR
14 BASE PLATE
15 CHAMBER
16 DISCHARGE PORT
20 HOPPER
21 DELIVERY MECHANISM
30 CARD LIFTING MECHANISM
31 CARRIAGE
32 DELIVERY DEVICE
40 CONTROLLER
41 CPU
42 MEMORY
43 CONTROL CIRCUIT
44 CONNECTION TERMINAL
50 PROCESSING DEVICE
51 CONVEYING MECHANISM
52 EXECUTING UNIT
53 SIGNAL OUTPUT UNIT
60 REJECT BOX
100 IC CHIP
110 MAGNETIC STRIPE
120, 121 PRINTED CHARACTER STRING
200 CONTROL TERMINAL
300 SYSTEM SERVER
C PROCESSED CARD
Cx CARD TO BE PROCESSED
L LABEL
S INSTANT CARD ISSUING SYSTEM

The invention claimed is:

1. A card issuing apparatus for creating a processed card and issuing the processed card to a card user, the card issuing apparatus comprising:
a plurality of processing units comprising at least a first processing unit configured to form at least one of a character string and a symbol on a surface of a card to be processed, and a second processing unit configured to record information on a recording medium comprised in the card to be processed;
an accommodation unit configured to accommodate the card to be processed;
a lifting unit configured to receive the card to be processed from the accommodation unit and to convey the received card to be processed in an up-down direction to deliver the card to be processed to each of the plurality of processing units; and
a control unit configured to control the lifting unit,
wherein each of the plurality of processing units comprises a plurality of constituent components integrated into a unit, is arranged in the up-down direction to be detachably fixed to a card issuing apparatus body, and delivers the card to be processed to the lifting unit after executing respective processing on the card to be processed which is received from the lifting unit,
the lifting unit is located outside of the accommodation unit, is provided between the accommodation unit and the plurality of processing units, conveys the card to be processed one-by-one in the up-down direction when the card to be processed is dispensed from the accommodation unit, delivers the card to be processed to one of the plurality of processing units, receives the card to be processed from the one of the plurality of processing units after the one of the plurality of processing units executes processing, and conveys the card to be processed in the up-down direction in order to deliver the card to be processed received from the one of the plurality of processing units to another processing unit,
the card issuing apparatus body comprises an equal or more number of storage units to a number of the plurality of processing units, which are arranged in the up-down direction, each storage unit storing only one processing unit inside thereof, and
the control unit recognizes which processing unit of the plurality of processing units is stored in each storage unit and controls the lifting unit based on correspondence between the storage unit and the processing unit so that the card to be processed is conveyed in the up-down direction to a position of the storage unit in which the processing unit that receives the card to be processed is stored.

2. The card issuing apparatus according to claim 1, wherein the plurality of processing units comprise a third processing unit configured to execute a process of attaching a cover configured to cover at least one of the character string and the symbol, which is formed on the surface of the card to be processed by the first processing unit, to the surface of the card to be processed, and the lifting unit delivers the card to be processed to the first processing unit, receives the card to be processed from the first processing unit after the first processing unit executes the processing, and conveys the card to be processed in the up-down direction in order to deliver the card to be processed received from the first processing unit to the third processing unit.

3. The card issuing apparatus according to claim 2, wherein the card issuing apparatus is configured to create plural types of processed cards by processing the plural types of the cards to be processed, and the accommodation unit is provided for each type of the cards to be processed.

4. The card issuing apparatus according to claim 1, further comprising:

a connection terminal provided for each of the storage units to be connected to the processing unit stored in the storage unit; and a signal output unit provided in the processing unit to output a signal for specifying the processing unit when the processing unit is connected to the connection terminal in the storage unit, wherein the control unit recognizes which processing unit of the plurality of processing units is stored in each of the storage units based on the signal that has been received from the signal output unit, and controls the lifting unit based on correspondence between the storage unit and the processing unit so that the card to be processed is conveyed in the up-down direction to a position of the storage unit in which the processing unit that receives the card to be processed is stored.

5. The card issuing apparatus according to claim 2, further comprising:

a connection terminal provided for each of the storage units to be connected to the processing unit stored in the storage unit; and a signal output unit provided in the processing unit to output a signal for specifying the processing unit when the processing unit is connected to the connection terminal in the storage unit, wherein the control unit recognizes which processing unit of the plurality of processing units is stored in each of the storage units based on the signal that has been received from the signal output unit, and controls the lifting unit based on correspondence between the storage unit and the processing unit so that the card to be processed is conveyed in the up-down direction to a position of the storage unit in which the processing unit that receives the card to be processed is stored.

6. The card issuing apparatus according to claim 3, further comprising:

a connection terminal provided for each of the storage units to be connected to the processing unit stored in the storage unit; and a signal output unit provided in the processing unit to output a signal for specifying the processing unit when the processing unit is connected to the connection terminal in the storage unit, wherein the control unit recognizes which processing unit of the plurality of processing units is stored in each of the storage units based on the signal that has been received from the signal output unit, and controls the lifting unit based on correspondence between the storage unit and the processing unit so that the card to be processed is conveyed in the up-down direction to a position of the storage unit in which the processing unit that receives the card to be processed is stored.

* * * * *